(12) United States Patent
Ding et al.

(10) Patent No.: US 11,770,166 B2
(45) Date of Patent: *Sep. 26, 2023

(54) DYNAMIC SCHEDULING OF USER EQUIPMENT (UE) ANTENNA RESOURCES

(71) Applicant: QUALCOMM Incorporated, San Diego, CA (US)

(72) Inventors: Ling Ding, Chester, NJ (US); Sony Akkarakaran, Poway, CA (US); Tao Luo, San Diego, CA (US); Jung Ho Ryu, Fort Lee, NJ (US); Junyi Li, Fairless Hills, PA (US); Jelena Damnjanovic, Del Mar, CA (US); Mahmoud Taherzadeh Boroujeni, San Diego, CA (US); Kapil Gulati, Belle Mead, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,678

(22) Filed: Jun. 29, 2022

(65) Prior Publication Data

US 2023/0015327 A1    Jan. 19, 2023

Related U.S. Application Data

(63) Continuation of application No. 17/130,732, filed on Dec. 22, 2020, now Pat. No. 11,405,082.
(Continued)

(51) Int. Cl.
*H04B 7/06* (2006.01)
*H04W 72/1263* (2023.01)

(52) U.S. Cl.
CPC ...... *H04B 7/0613* (2013.01); *H04W 72/1263* (2013.01)

(58) Field of Classification Search
CPC .. H04B 7/0613; H04B 7/0491; H04B 7/0608; H04B 7/0695; H04B 7/0802;
(Continued)

(56) References Cited

U.S. PATENT DOCUMENTS 10,886,997 B2    1/2021  Lu et al.
2017/0181010 A1   6/2017  Burgess et al.
(Continued)

OTHER PUBLICATIONS

International Search Report and Written Opinion—PCT/US2020/066790—ISA/EPO—dated Mar. 31, 2021.

*Primary Examiner* — Sung S Ahn
(74) *Attorney, Agent, or Firm* — Danai Nelisile Mhembere; Patterson & Sheridan, LLP

(57) ABSTRACT

Certain aspects of the present disclosure provide techniques for dynamically scheduling antenna resources of a wireless node, such as, antenna panels of a user equipment (UE). In some cases, a first node (e.g., a UE) performs, with two or more other nodes, a first beam sweep procedure across two or more antenna resources of the first node on two or more wireless interfaces, generates or obtains scheduling information based on results of the first beam sweep procedure, wherein the scheduling information indicates which of the antenna resources is scheduled for which wireless interfaces, and communicates with the other nodes on the wireless interfaces according to the scheduling information.

30 Claims, 12 Drawing Sheets

Related U.S. Application Data

(60) Provisional application No. 62/953,437, filed on Dec. 24, 2019.

(58) Field of Classification Search
CPC . H04B 7/088; H04B 7/0408; H04W 72/1263; H04W 72/23
See application file for complete search history.

(56) References Cited

U.S. PATENT DOCUMENTS

| | | |
|---|---|---|
| 2019/0014570 A1* | 1/2019 | Nam .................... H04B 7/0695 |
| 2019/0089499 A1* | 3/2019 | Nam .................... H04L 5/0048 |
| 2019/0215043 A1* | 7/2019 | Trainin ................ H04L 5/0055 |
| 2021/0194554 A1 | 6/2021 | Ding |

* cited by examiner

Accessibility Information Based on
Measurements at time *t1*

|  | gNB | UE1 |
|---|---|---|
| panel-1 | 0 | 0 |
| panel-2 | 0 | X |

FIG. 9

| Multiplexing mode | scheduling | comment |
|---|---|---|
| TDM | panel-1 & 2 to Uu (gNB), panel-1 to SL (UE1) | • scheduling decision is made based on meas results from level-1 P1 procedure tougher with some priority rule<br>• The scheduled panel(s) are then used for level-2 P1/P2/P3.<br>  • The level-2 P1/P2/P3 procedure is expedited for<br>    (a) the SL interface (UE1) of the TDM case and<br>    (b) both interfaces (Uu & SL) of the SDM/FDM case |
| SDM/FDM | panel-2 to Uu (gNB), panel-1 to SL (UE1) | |

FIG. 10

Accessibility Information Based on Measurements at time *t1*

|  | gNB | UE1 | UE2 |
|---|---|---|---|
| panel-1 | O | X | O |
| panel-2 | O | X | X |
| panel-3 | X | O | O |
| panel-4 | X | O | O |

FIG. 11A

Accessibility Information Based on Measurements at time *t2*

| panels | gNB | UE1 | UE2 |
|---|---|---|---|
| panel-1 | O | O | O |
| panel-2 | O | O | X |
| panel-3 | X | X | O |
| panel-4 | X | X | O |

FIG. 11B

DYNAMIC SCHEDULING OF USER EQUIPMENT (UE) ANTENNA RESOURCES

CROSS-REFERENCE TO RELATED APPLICATION(S)

This application is a continuation of U.S. patent application Ser. No. 17/130,732, filed Dec. 22, 2020, which claims benefit of and priority to U.S. Provisional Application No. 62/953,437, filed Dec. 24, 2019, each of which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for dynamically scheduling antenna resources of a wireless node, such as, antenna panels of a user equipment (UE).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In a LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NodeB (NB), next generation NB (gNB or gNodeB), transmission reception point (TRP), etc.). A BS or DU may communicate with a set of UEs on downlink (DL) channels (e.g., for transmissions from a BS or DU to a UE) and uplink (UL) channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points (Aps) and stations (STAs) in a wireless network.

One or more aspects of the subject matter described in this disclosure can be implemented in a method for wireless communication by a first node. The method generally includes performing, with two or more other nodes, a first beam sweep procedure across two or more antenna resources of the first node on two or more wireless interfaces. The method generally includes generating or obtaining scheduling information based on results of the first beam sweep procedure, wherein the scheduling information indicates which of the antenna resources is scheduled for which wireless interfaces. The method generally includes communicating with the other nodes on the wireless interfaces according to the scheduling information.

One or more aspects of the subject matter described in this disclosure can be implemented in a method for wireless communication by a scheduling node. The method generally includes receiving results of a first beam sweep procedure performed by a first node across two or more antenna resources of the first node on two or more wireless interfaces. The method generally includes generating scheduling information based on results of the first beam sweep procedure, wherein the scheduling information indicates which of the antenna resources of the first node is scheduled for which of the wireless interface. The method generally includes transmitting the scheduling information to the first node.

One or more aspects of the subject matter described in this disclosure can be implemented in an apparatus for wireless communication by a first node. The apparatus generally includes a memory and at least one processor coupled to the memory, the memory and the at least one processor being configured to perform, with two or more other nodes, a first beam sweep procedure across two or more antenna resources of the first node on two or more wireless interfaces, generate or obtain scheduling information based on results of the first beam sweep procedure, wherein the scheduling information indicates which of the antenna resources is scheduled for which of the wireless interfaces, and communicate with the other nodes on the wireless interfaces according to the scheduling information.

One or more aspects of the subject matter described in this disclosure can be implemented in an apparatus for wireless communication by a scheduling node. The apparatus generally includes a memory and at least one processor coupled to the memory, the memory and the at least one processor being configured to receive results of a first beam sweep procedure performed by a first node across two or more antenna resources of the first node on at least two or more wireless interfaces, generate scheduling information based on results of the first beam sweep procedure, wherein the scheduling information indicates which of the antenna resources of the first node is scheduled for which of the wireless interfaces, and transmit the scheduling information to the first node.

One or more aspects of the subject matter described in this disclosure can be implemented in an apparatus for wireless communication by a first node. The apparatus generally includes means for performing, with two or more other nodes, a first beam sweep procedure across two or more antenna resources of the first node on two or more wireless interfaces, means for generating or obtaining scheduling information based on results of the first beam sweep procedure, wherein the scheduling information indicates which of the antenna resources is scheduled for which of the wireless interfaces, and means for communicating with the other nodes on the wireless interfaces according to the scheduling information.

One or more aspects of the subject matter described in this disclosure can be implemented in an apparatus for wireless communication by a scheduling node. The apparatus generally includes means for receiving results of a first beam sweep procedure performed by a first node across two or more antenna resources of the first node on at least two or more wireless interfaces, means for generating scheduling information based on results of the first beam sweep procedure, wherein the scheduling information indicates which of the antenna resources of the first node is scheduled for which of the wireless interfaces, and means for transmitting the scheduling information to the first node.

One or more aspects of the subject matter described in this disclosure can be implemented in a computer-readable medium having instructions stored thereon to cause a first node to perform, with two or more other nodes, a first beam sweep procedure across two or more antenna resources of the first node on two or more wireless interfaces, generate or obtain scheduling information based on results of the first beam sweep procedure, wherein the scheduling information indicates which of the antenna resources is scheduled for which of the wireless interfaces, and communicate with the other nodes on the wireless interfaces according to the scheduling information.

One or more aspects of the subject matter described in this disclosure can be implemented in a computer-readable medium having instructions stored thereon to cause a scheduling node to receive results of a first beam sweep procedure performed by a first node across two or more antenna resources of the first node on at least two or more wireless interfaces, generate scheduling information based on results of the first beam sweep procedure, wherein the scheduling information indicates which of the antenna resources of the first node is scheduled for which of the wireless interfaces, and transmit the scheduling information to the first node.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure, and the description may admit to other equally effective aspects.

FIG. 9 illustrates an example table of accessibility information, in accordance with certain aspects of the present disclosure.

FIG. 10 illustrates example scheduling modes, in accordance with certain aspects of the present disclosure.

FIGS. 11A and 11B illustrate example tables of accessibility information at different times, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
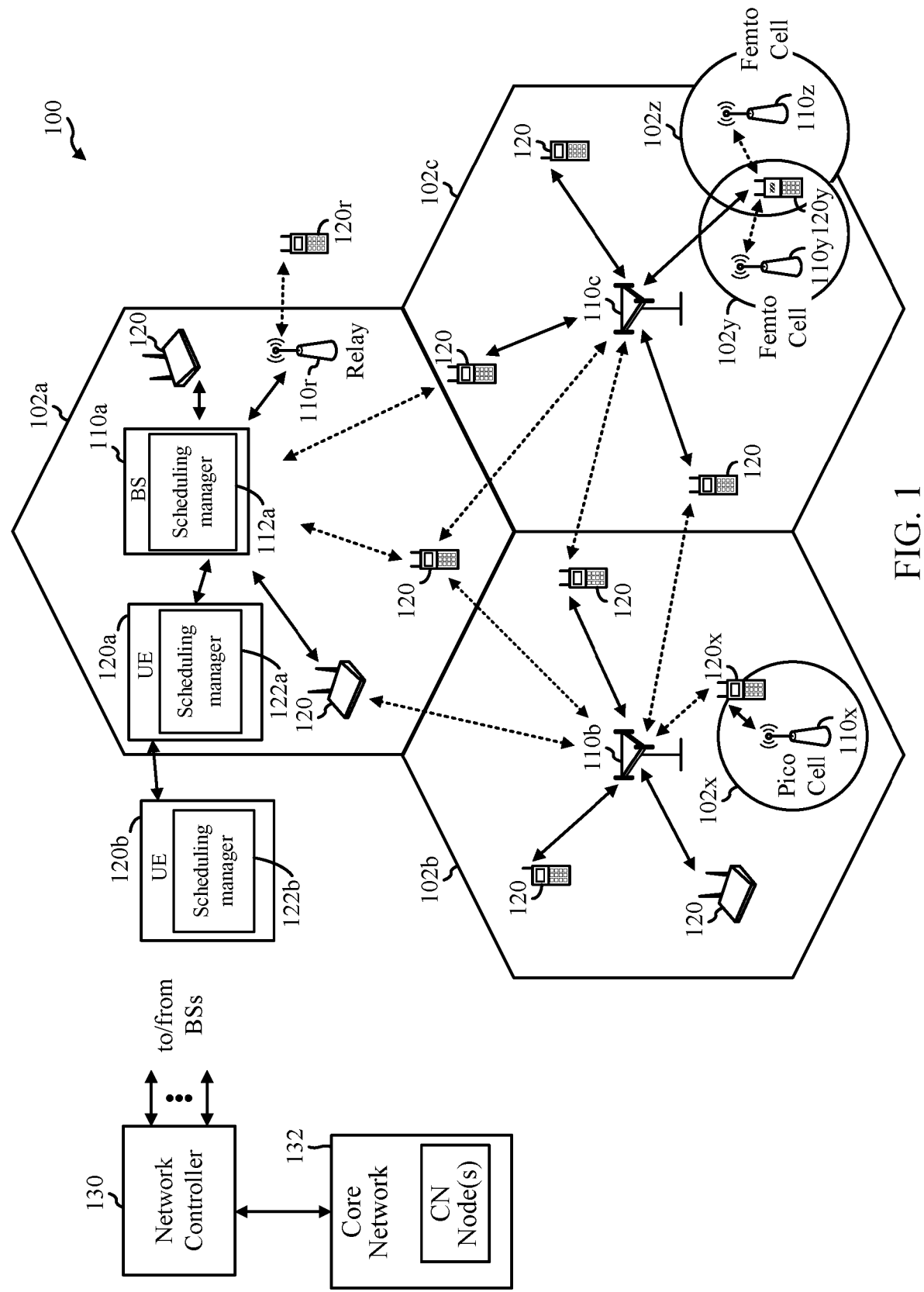
FIG. 1 is a block diagram conceptually illustrating an example telecommunications system, in accordance with certain aspects of the present disclosure.

Aspects of the present disclosure provide apparatus, methods, processing systems, and computer readable mediums or dynamically scheduling antenna resources of a wireless node, such as, antenna panels of a user equipment (UE).

The following description provides examples of dynamic scheduling of UE multiple transmission reception points (mTRPs)/panels. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as Long Term Evolution (LTE), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) system (e.g., a 5G NR network). The core network 132 may be in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, UEs 120a-y and/or BSs 110a-z of FIG. 1 may be configured to perform operations described below with reference to FIGS. 7 and 8. For example, the UE 120a includes a scheduling manager 122a, the UE 120b includes a scheduling manager 122b, and the BS 110a includes a scheduling manager 112a. The scheduling manager 122a, the scheduling manager 122b, and/or the scheduling manager 112a may be configured to dynamically schedule antenna resources of wireless nodes using multiple interfaces.

A BS may be a station that communicates with UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations (e.g., relay station 110r), also referred to as relays or the link, that receive a transmission of data and/or other information from an upstream station (e.g., a BS 110a or a UE 120r) and send a transmission of the data and/or other information to a downstream station (e.g., a UE 120 or a BS 110) or that relay transmissions between UEs, to facilitate communication between devices.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs 110 and provide coordination and control for these BSs 110. The network controller 130 may communicate with the BSs 110 via a backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the UL and DL and include support for half-duplex operation using time division duplex (TDD). Beamforming may be supported and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
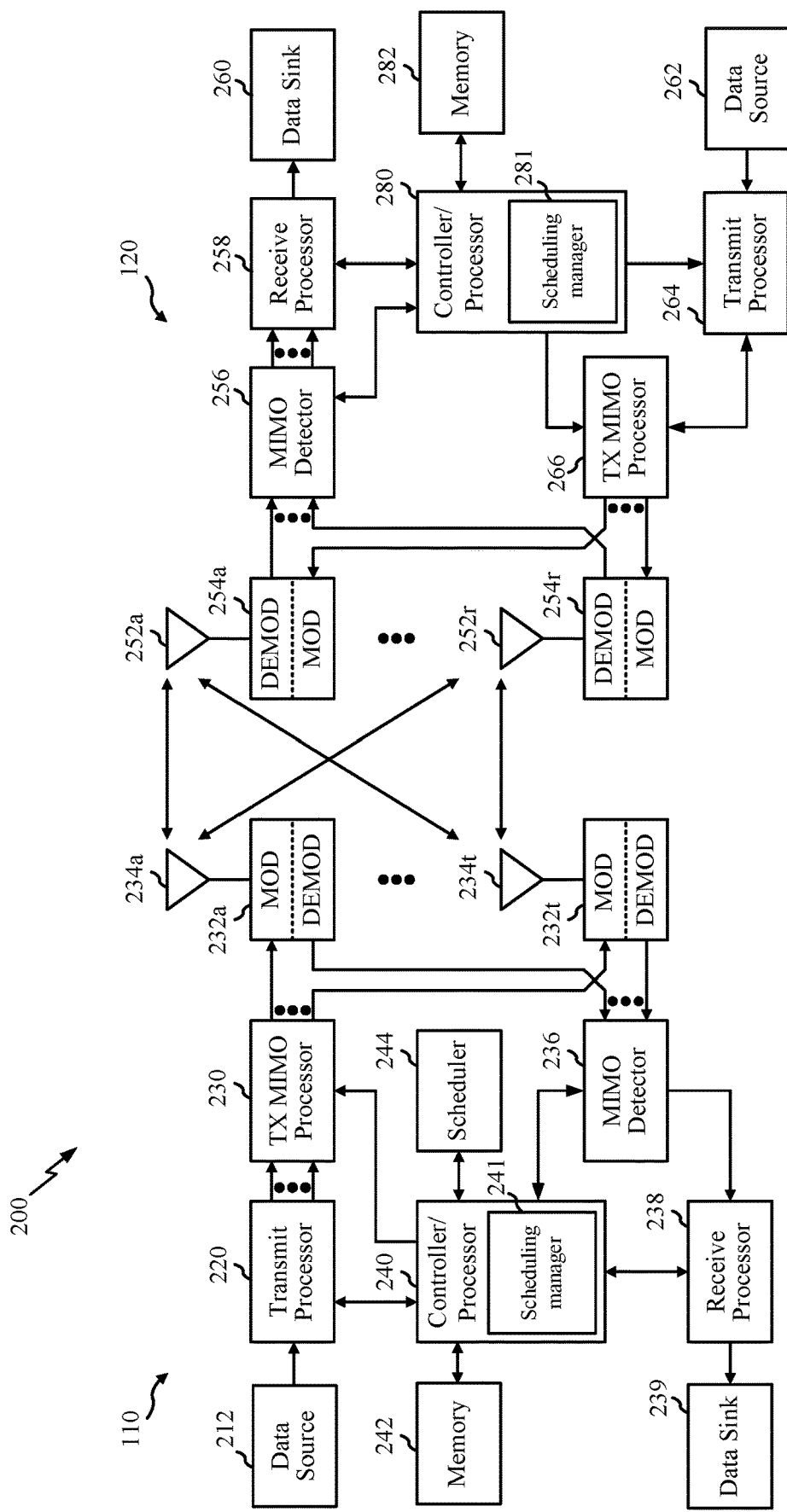
FIG. 2 is a block diagram conceptually illustrating a design of an example base station (BS) and user equipment (UE), in accordance with certain aspects of the present disclosure.

FIG. 2 illustrates example components of BS 110 and UE 120 (e.g., BS 110a and UE 120a in the wireless communication network 100 of FIG. 1, which may be similar components in the UE 120b), which may be used to implement aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a BS may transmit a MAC CE to a UE to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120, the antennas 252a-252r may receive the downlink signals from the BS 110 (or sidelink (SL) signals from the UE 120b in the wireless communication network of FIG. 1), and may provide received signals to the demodulators (DEMODs) in transceivers 254a-254r, respectively. Each demodulator may condition (e.g., filter, amplify, down-convert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the UL and or SL, at UE 120, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110. At the BS 110, the UL signals from the UE 120 may be received by the antennas 234, processed by the modulators, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the DL and/or UL.

Antennas 252, processors 266, 258, 264, and/or controller/processor 280 of the UE 120 and/or antennas 234, processors 220, 230, 238 may be used to perform the various techniques and methods described herein. For example as shown in FIG. 2, the controller/processor 280 of the UE 120 has a scheduling manager 281 and the controller/processor 240 of the BS 110 has a scheduling manager 241. The scheduling manager 281 and/or the scheduling manager 241 may be configured to dynamically schedule antenna resources of wireless nodes using multiple interfaces.

Figure 3:
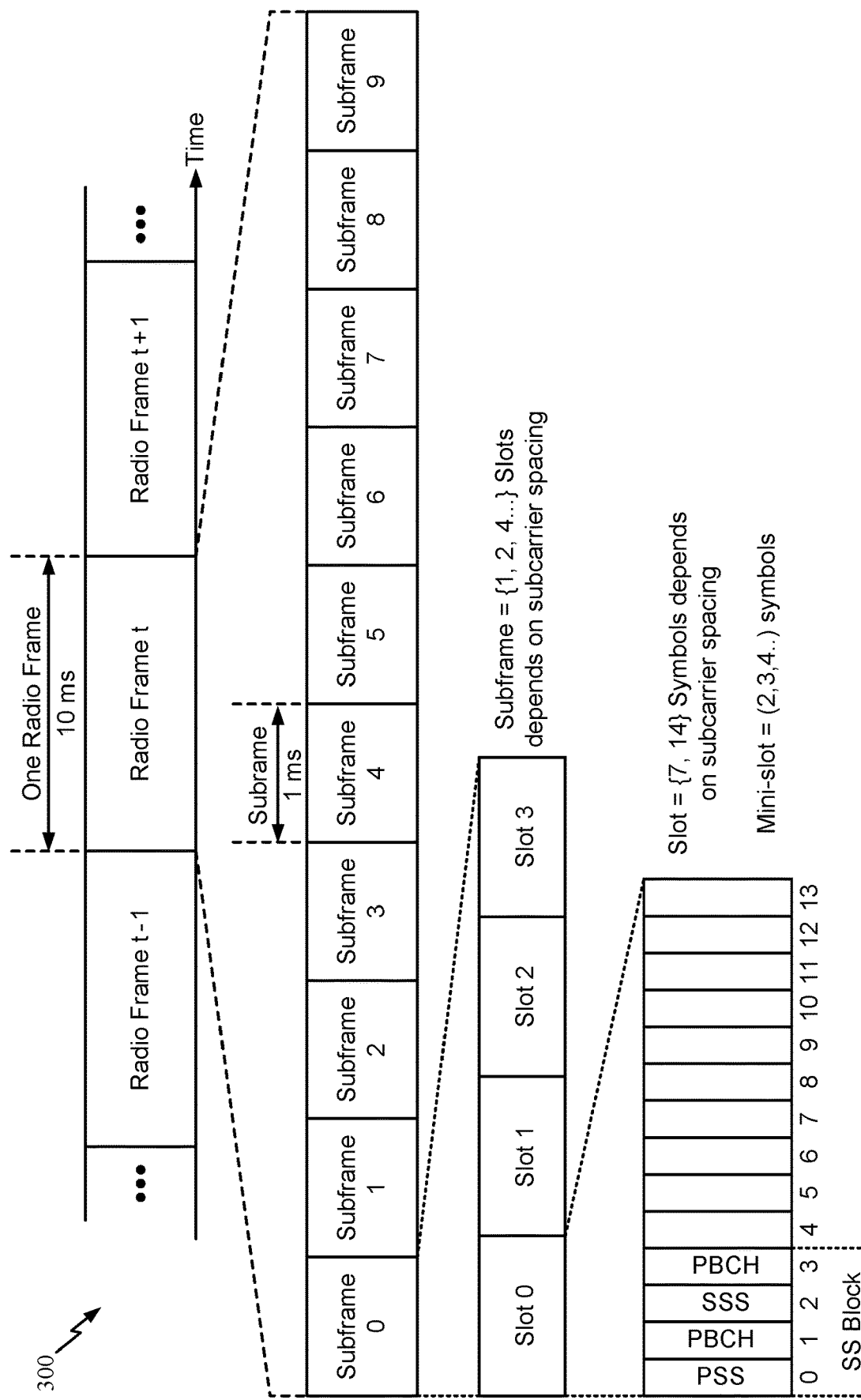
FIG. 3 illustrates an example of a frame format for a telecommunication system, in accordance with certain aspects of the present disclosure

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the subcarrier spacing (SCS). Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SS blocks in different SS bursts sets may be transmitted at different frequency regions.

Example Beam Management Procedures

Figure 4:
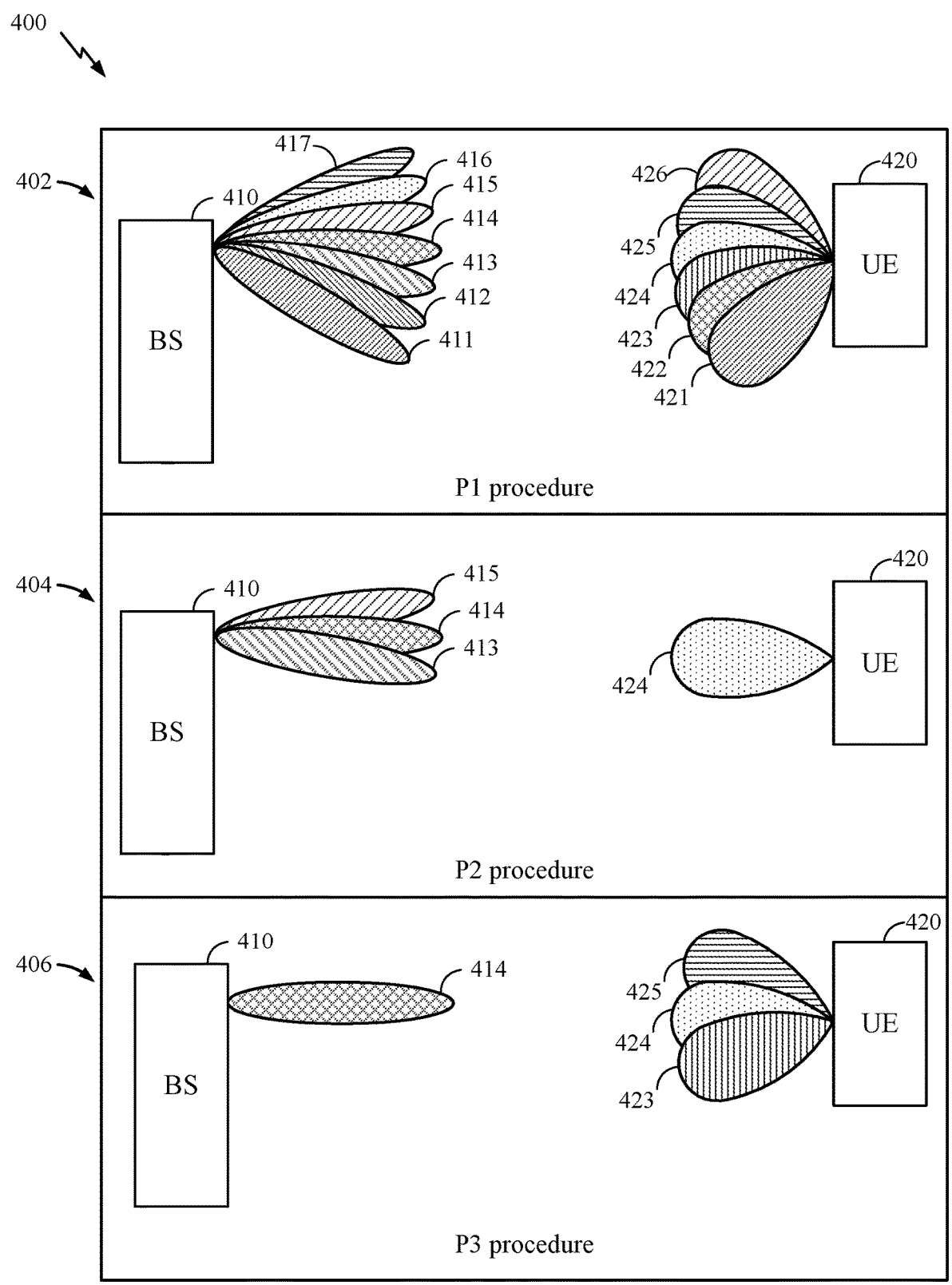
FIG. 4 illustrates example beam management procedures, in accordance with certain aspects of the present disclosure.

FIG. 4 illustrates example beam management procedures, in accordance with certain aspects of the present disclosure. As shown in FIG. 4, beam management procedures may be divided into three phases: P1 procedure, P2 procedure, and P3 procedure. In 5G New Radio (NR), the beam management procedure for determining beam pair links (BPLs) may be referred to as a P1 procedure. A base station (BS) 410 (e.g., such as the BS 110a in FIG. 1 and/or FIG. 2) may send a measurement request to a user equipment (UE) 420 (e.g., such as the UE 120a in FIG. 1 and/or FIG. 2) and may subsequently transmit one or more signals (sometimes referred to as the "P1-signal") to the UE 420 for measurement. In the P1 procedure 402, the BS 410 may transmit the signal with beam forming in a different spatial direction (corresponding to a transmit beam 411, 412, . . . , 417) in each symbol, such that several (e.g., most or all) relevant spatial locations of the cell of the BS 410 are reached. In this manner, the BS 410 may transmit the signal using different transmit beams over time in different directions. In some examples, a synchronization signal block (SSB) may be used as the P1-signal. In some examples, a channel state information reference signal (CSI-RS), a demodulation reference signal (DMRS), or another downlink (DL) signal may be used as the P1-signal.

In the P1 procedure 402, to successfully receive at least a symbol of the P1-signal, the UE 420 may find (e.g., determine/select) an appropriate receive beam (421, 422, . . . , 426). Signals (e.g., SSBs) from multiple BSs may be measured simultaneously for a given signal index (e.g., SSB index) corresponding to a given time period. The UE 420 may apply a different receive beam during each occurrence (e.g., each symbol) of the P1-signal. Once the UE 420 succeeds in receiving a symbol of the P1-signal, the UE 420 and BS 410 may have discovered a BPL (i.e., the UE receive (RX) beam used to receive the P1-signal in the symbol and the BS transmit (TX) beam used to transmit the P1-signal in the symbol). In some cases, the UE 420 may not search all of its possible UE RX beams until it finds the best UE RX beam, since this causes additional delay. Instead, the UE 420 may select a RX beam once the RX beam is "good enough", for example, having a quality (e.g., signal to noise ratio (SNR) or signal to interference and noise ratio (SINR)) that satisfies a threshold (e.g., predefined threshold). The UE 420 may not know which beam the BS 410 used to transmit the P1-signal in a symbol; however, the UE 420 may report to the BS 410 the time at which it observed the signal. For example, the UE 420 may report the symbol index in which the P1-signal was successfully received to the BS 410. The BS 410 may receive this report and determine which BS TX beam the BS 410 used at the indicated time. In some examples, UE 420 may measure signal quality of the P1-signal, such as reference signal receive power (RSRP) or another signal quality parameter (e.g., SNR, channel flatness, etc.). The UE 420 may report the measured signal quality (e.g., RSRP) to the BS 410 together with the symbol index. In some cases, the UE 420 may report multiple symbol indices to the BS 410, corresponding to multiple BS TX beams.

As a part of a beam management procedure, the BPL used between a UE 420 and BS 110 may be refined/changed. For example, the BPL may be refined periodically to adapt to changing channel conditions, for example, due to movement of the UE 420 or other objects, fading due to Doppler spread, etc. The UE 420 may monitor the quality of a BPL (e.g., a BPL found/selected during the P1 procedure and/or a previously refined BPL) to refine the BPL when the quality drops (e.g., when the BPL quality drops below a threshold or when another BPL has a higher quality). In 5G NR, the beam management procedures for beam refinement of BPLs may be referred to as the P2 and P3 procedures to refine the BS-beam and UE-beam, respectively, of an individual BPL.

As shown in FIG. 4, for the P2 procedure 404, the BS 410 may transmit symbols of a signal with different BS-beams (e.g., TX beams 415, 414, 413) that may be spatially close to the BS-beam of the current BPL. For example, the BS 410 may transmit the signal in different symbols using neighboring TX beams (e.g., beam sweeps) around the TX beam of the current BPL. As shown in FIG. 4, the TX beams used by the BS 410 for the P2 procedure 404 may be different from the TX beams used by the BS 410 for the P1 procedure 402. For example, the TX beams used by the BS 410 for the P2 procedure 404 may be spaced closer together and/or may be more focused (e.g., narrower) than the TX beams used by the BS 410 for the P1 procedure. During the P2 procedure 404, the UE 420 may keep its RX beam (e.g., RX beam 424) constant. The UE 420 may measure the signal quality (e.g., RSRP) of the signal in the different symbols and indicate the symbol in which the highest signal quality was measured. Based on the indication, the BS 410 may determine the strongest (e.g., best, or associated with the highest signal quality) TX beam (i.e., the TX beam used in the indicated symbol). The BPL may be refined accordingly to use the indicated TX beam.

As shown in FIG. 4, for the P3 procedure 406, the BS 420 may maintain a constant TX beam (e.g., the TX beam of the current BPL) and transmit symbols of a signal using the constant TX beam (e.g., TX beam 414). During the P3 procedure 406, the UE 420 may scan the signal using different RX beams (e.g., RX beams 423, 424, 425) in different symbols. For example, the UE 420 may perform a sweep using neighboring RX beams to the RX beam in the current BPL (i.e., the BPL being refined). The UE 420 may measure the signal quality (e.g., RSRP) of the signal for each RX beam and identify the strongest UE RX beam. The UE 420 may use the identified RX beam for the BPL. The UE 420 may report the signal quality to the BS 410.

Example Sidelink (SL) Scenarios

While the communication between the user equipments (UEs) (e.g., UEs 120 of FIGS. 1 and 2) and base stations (BSs) (e.g., BSs 110 of FIGS. 1 and 2) may be referred to as the access link, and the access link may be provided via a Uu interface, communication between devices may be referred as the sidelink (SL).

In some circumstances, two or more subordinate entities (e.g., UEs) may communicate with each other using SL signals. Real-world applications of such SL communications may include public safety, proximity services, UE-to-network relaying, vehicle-to-vehicle (V2V) communications, Internet of Everything (IoE) communications, Internet of Things (IoT) communications, mission-critical mesh, and/or various other suitable applications.

Generally, a SL signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the SL signals may be communicated using a licensed spectrum (unlike wireless local area networks (WLANs), which typically use an unlicensed spectrum).

Figure 5A:
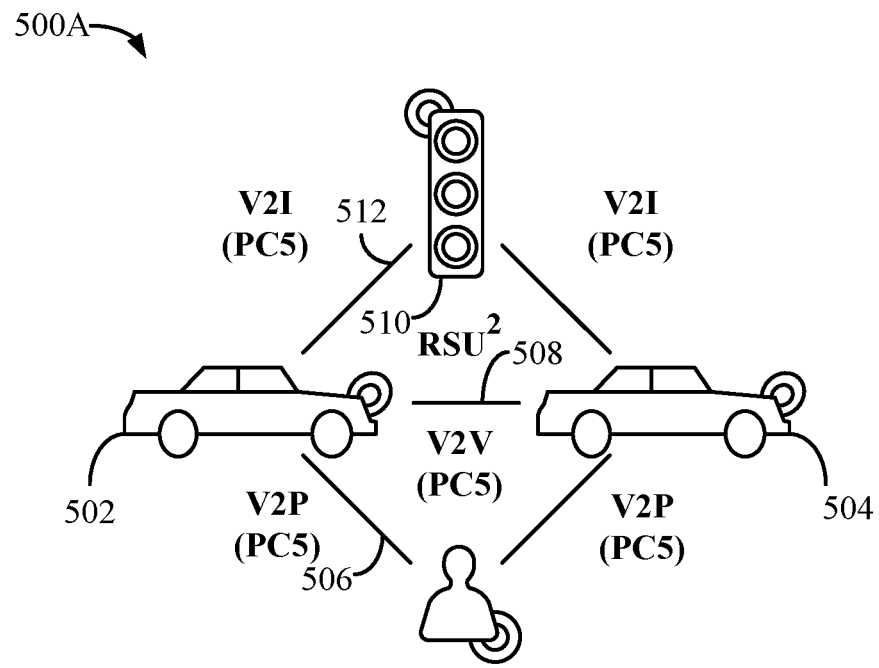
FIGS. 5A and 5B show diagrammatic representations of example vehicle to everything (V2X) systems, in accordance with certain aspects of the present disclosure.
Figure 5B:
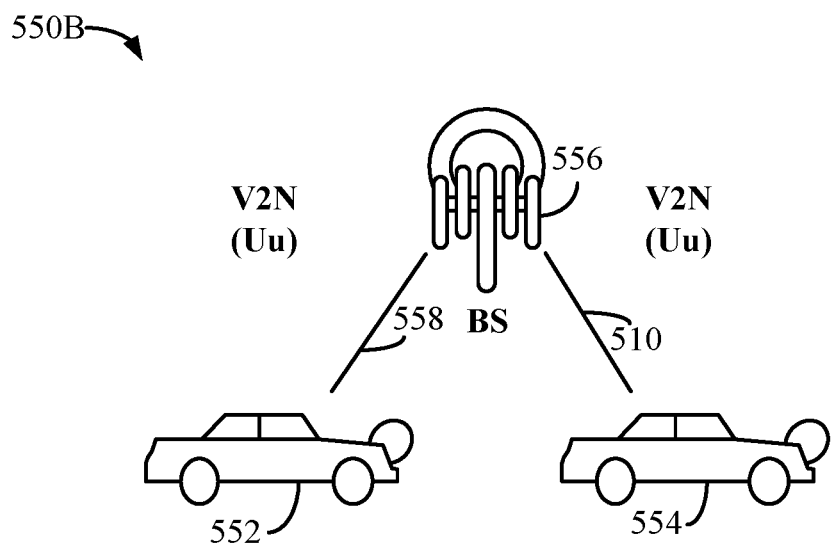

FIGS. 5A and 5B show diagrammatic representations of example vehicle to everything (V2X) systems, in accordance with some aspects of the present disclosure. For example, the vehicles shown in FIGS. 5A and 5B may communicate via SL channels and may perform SL channel state information (CSI) reporting as described herein.

The V2X systems, provided in FIGS. 5A and 5B provide two complementary transmission modes. A first transmission mode, shown by way of example in FIG. 5A, involves direct communications (for example, also referred to as SL communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500A (for example, including vV2V communications) is illustrated with two vehicles 502, 504. The first transmission mode may allow for direct communication between different participants in a given geographic location. As illustrated, a vehicle may have a wireless communication link 506 with an individual (vehicle-to-pedestrian (V2P)) (for example, via a UE) through a PC5 interface. Communications between the vehicles 502 and 504 may also occur through a PC5 interface 508. In a like manner, communication may occur from a vehicle 502 to other highway components (for example, highway component 510), such as a traffic signal or sign (V2I) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a BS (for example, an eNB or gNB), that sends and receives information to and from (for example, relays information between) vehicles 552, 554. The network communications through vehicle to network (V2N) links 558 and 510 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data may be obtained from cloud-based sharing services.

As described above, V2V and V2X communications are examples of communications that may be transmitted via a SL. Other applications of SL communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a SL may refer to a direct link between one subordinate entity (for example, UE1) and another subordinate entity (for example, UE2).

Various sidelink channels may be used for SL communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as SL resource configurations and other parameters used for data transmissions, and the PSSCH may carry the data transmissions.

For the operation regarding PSSCH, a UE may perform either transmission or reception in a slot on a carrier. NR SL may support for a UE a case where all the symbols in a slot may be available for SL, as well as another case where only a subset of consecutive symbols in a slot may be available for SL.

PSFCH may carry feedback such as CSI related to a sidelink channel quality. A sequence-based PSFCH format with one symbol (not including automatic gain control (AGC) training period) may be supported. The following formats may be possible: a PSFCH format based on PUCCH format 2 and a PSFCH format spanning all available symbols for sidelink in a slot.

Figure 6A:
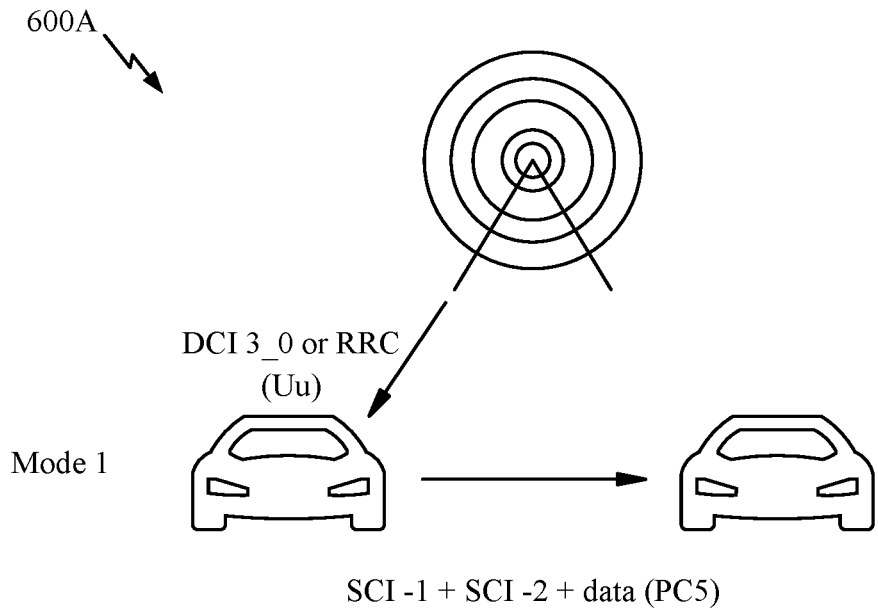
FIGS. 6A and 6B illustrate two modes of sidelink (SL) communications, in accordance with certain aspects of the present disclosure.
Figure 6B:
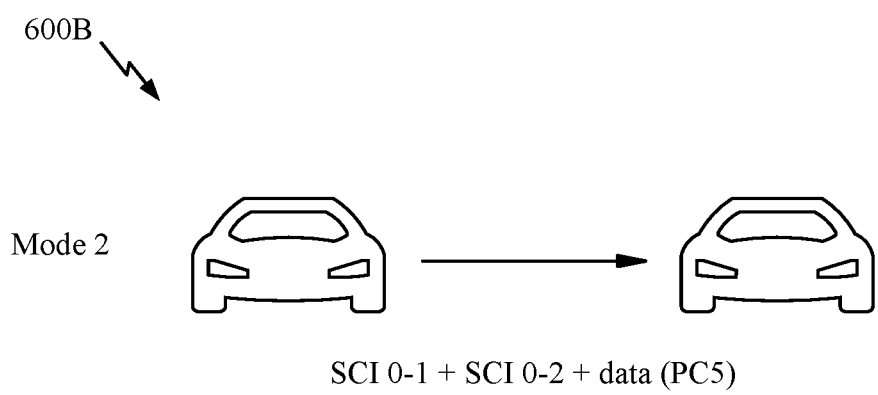

In NR, there are generally two basic SL resource allocation modes. FIGS. 6A and 6B illustrate two modes of SL communication, in accordance with certain aspects of the present disclosure. According to a first mode, Mode 1, as shown in FIG. 6A, a BS may allocate SL resources for SL communication between UEs.

According to a second mode, Mode 2, as shown in FIG. 6B, UEs may determine the SL resources (the BS does not schedule SL transmission resources within SL resources configured by BS/network). In this case, UEs may autonomously select SL resources for transmission (following some rules in the NR standard). A UE may assist in SL resource selection for other UEs. A UE may be configured with an NR configured grant for SL transmission, and the UE may schedule SL transmissions for other UEs.

Example Dynamic Scheduling of User Equipment (UE) Multiple Transmission Reception Points (mTRPs)/Panels Certain aspects of the present disclosure provide techniques for dynamically scheduling antenna resources of a wireless node, such as, antenna panels of a user equipment (UE). In some cases, the scheduling may be performed to allocate antenna panels to different communication interfaces, such as sidelink (SL) and cellular (Uu) interfaces.

As noted above, with SL communications, a UE may communicate with different nodes (e.g., with a BS and another UE, or with several other UEs) over multiple communication interfaces (e.g., using one interface per node).

The techniques presented herein may be used to dynamically schedule antenna resources of such wireless nodes to different communication interfaces (e.g., antenna panels of a UE or transmission reception point (TRP)). A TRP may have an antenna array capable of generating analog beams (e.g., a 4×4 array may generate 16 beams) for transmission. A UE may have multiple antenna arrays arranged as panels. For example, a UE may be equipped with two panels facing in opposite directions (e.g., each panel with a 2×4 array for 8 analog beams). Each of the analog beams for a panel may have multiple antenna ports (e.g., 2 receive antenna ports per panel or 4 total for two panels).

In cases where a UE is capable of communicating with multiple antenna resources, such as multiple TRPs (mTRPs) and/or multiple panels, determining how to schedule antenna resources to multiple interfaces, thereby enabling the UE to communicate with different nodes, may be challenging.

As noted above, different nodes may be at different directions and accessible by one or more UE TRPs/panels. One UE TRP/panel may be accessible by different nodes; however, one node may not be able to access the TRP/panel at the same time another node is accessing the same TRP/panel. In other words, one UE TRP/panel may not be accessible simultaneously by different nodes. This may be especially true when a panel generates narrow beams, which are often used to achieve better performance for data traffic. Thus, from the viewpoint of data channels, it may be reasonable for a UE to use one TRP/panel per communication interface.

While one antenna resource may be used on one interface at a time, when using time division multiplexing (TDM), the same antenna resource may be shared among multiple UE communication interfaces. At any time, each interface may use all the antenna resources; however, all the antenna resources may not be accessible to the corresponding node at all times. This may be due to bad channel conditions (e.g., blockage) and/or channel conditions rapidly changing over time.

While considering the impact of rapidly changing channel conditions, aspects of the present disclosure may provide techniques for performing dynamic scheduling of the TRP/panel antenna resources to multiple interfaces, based on measurements and various rules (e.g., with different interfaces having different priorities based on different traffic types, channel conditions, and the like).

In addition to, or as an alternative to TDM, spatial division multiplexing (SDM) and/or frequency division multiplexing (FDM) may be used to allocate the TRP/panel antenna resources among multiple communication interfaces. Using SDM or FDM, or both, the same TRP/panel antenna resource may be shared among multiple interfaces at the same time.

As will be described in greater detail below, when using TDM, SDM, and/or FDM, each interface may be assigned a portion of the TRP/panel resources that may be accessible to the node and that the UE may communicate with over the interface.

Using the dynamic scheduling techniques presented herein, for a given interface, a portion of resources allocated to an interface may change, for example, due to the time-changing channel conditions. In some cases, the dynamic scheduling described herein may make beam training more efficient. For example, if a target node is found not to be accessible using a particular resource, dynamic scheduling may allow a node to avoid scheduling antenna resources, thereby reducing beam training time. Additionally, efficient beam training may help avoid beam failures, for example, by efficiently identifying potential problem beams and performing beam switching to better beams, when necessary.

A P1 procedure, described above with reference to FIG. 4, for a UE having several mTRPs/panels may be time consuming due to the number of broad beams that may be involved. Therefore, performing beam training based on dynamically scheduled antenna resources may be more efficient than conventional P1, P2, and/or P3 procedures, described above with reference to FIG. 4, that are typically performed across all the UE antenna resources (mTRPs/panels).

Figure 7:
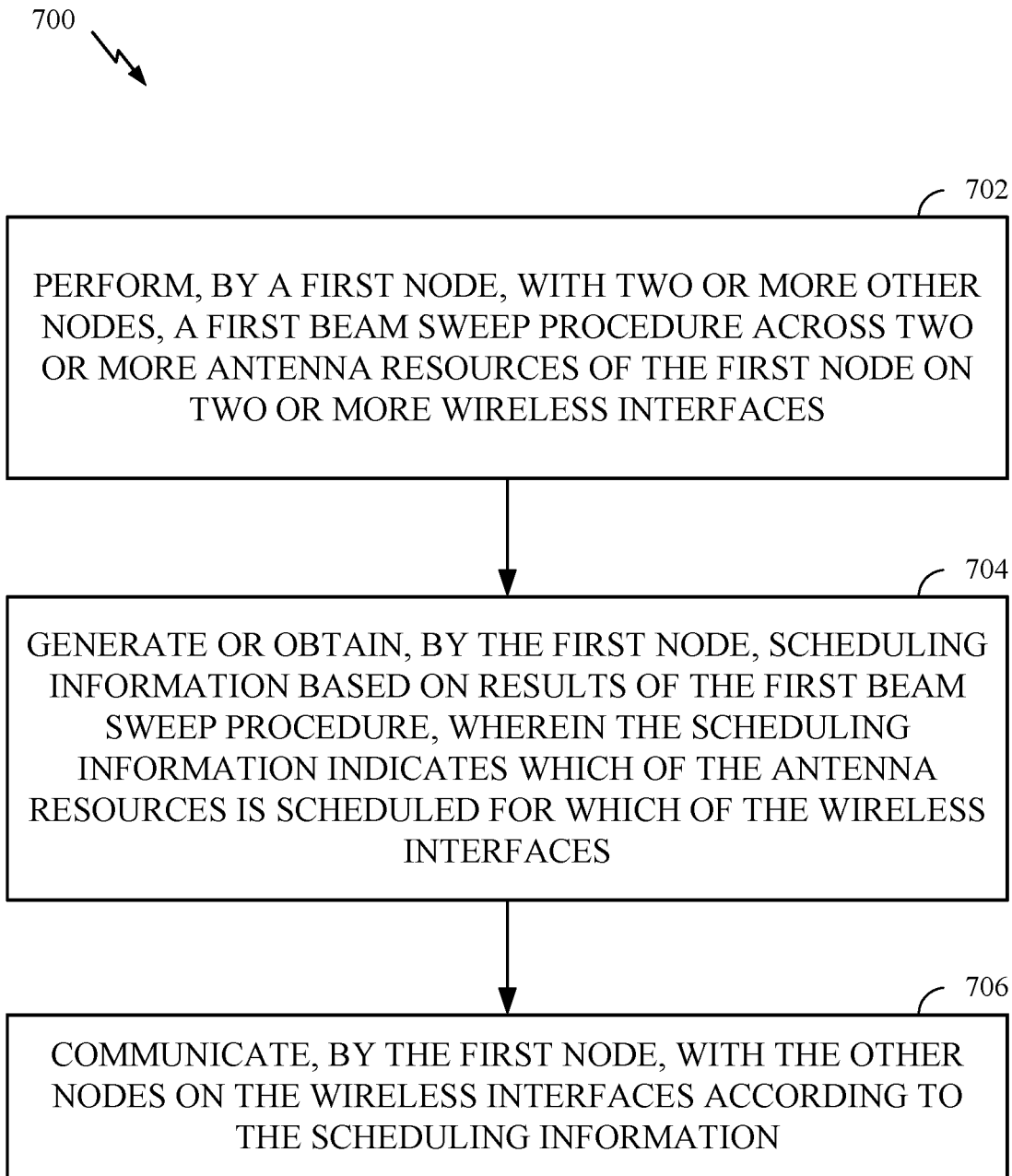
FIG. 7 is a flow diagram illustrating example operations for wireless communications that may be performed by a first node, in accordance with certain aspects of the present disclosure.

FIG. 7 is a flow diagram illustrating example operations 700 for wireless communication, in accordance with certain aspects of the present disclosure. The operations 700 may be performed, for example, by a first node (e.g., such as a UE 120a in FIG. 1). In other words, the first node may be a UE that may benefit from dynamic scheduling of its antenna resources (e.g., mTRPs/panel resources).

Operations 700 may be implemented as software components that are executed and run on one or more processors (e.g., controller/processor 280 of FIG. 2). Further, the transmission and reception of signals by the first node in operations 700 may be enabled, for example, by one or more antennas (e.g., antennas 252 of FIG. 2). In certain aspects, the transmission and/or reception of signals by the first node may be implemented via a bus interface of one or more processors (e.g., controller/processor 280) obtaining and/or outputting signals.

Operations 700 may begin, at 702, by a first node, performing, with two or more other nodes, a first beam sweep procedure across two or more antenna resources of the first node on two or more wireless interfaces. At 704, the first node generates or obtains scheduling information based on results of the first beam sweep procedure, wherein the scheduling information indicates which of the antenna resources is scheduled for which of the wireless interface. At 706, the first node communicates with the other nodes on the wireless interfaces according to the scheduling information.

Figure 8:
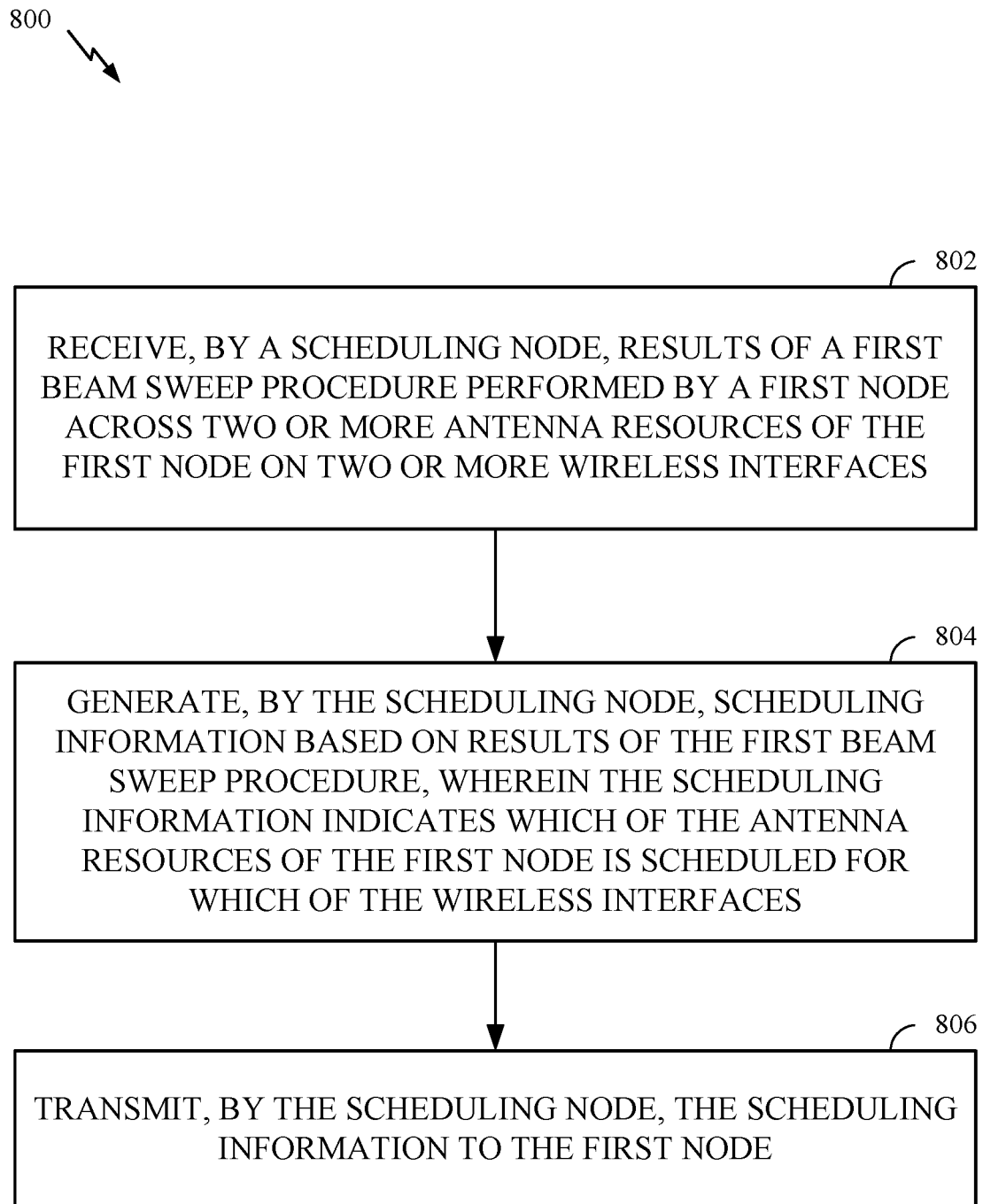
FIG. 8 is a flow diagram illustrating example operations for wireless communications that may be performed by a scheduling node, in accordance with certain aspects of the present disclosure.
Figure 12:
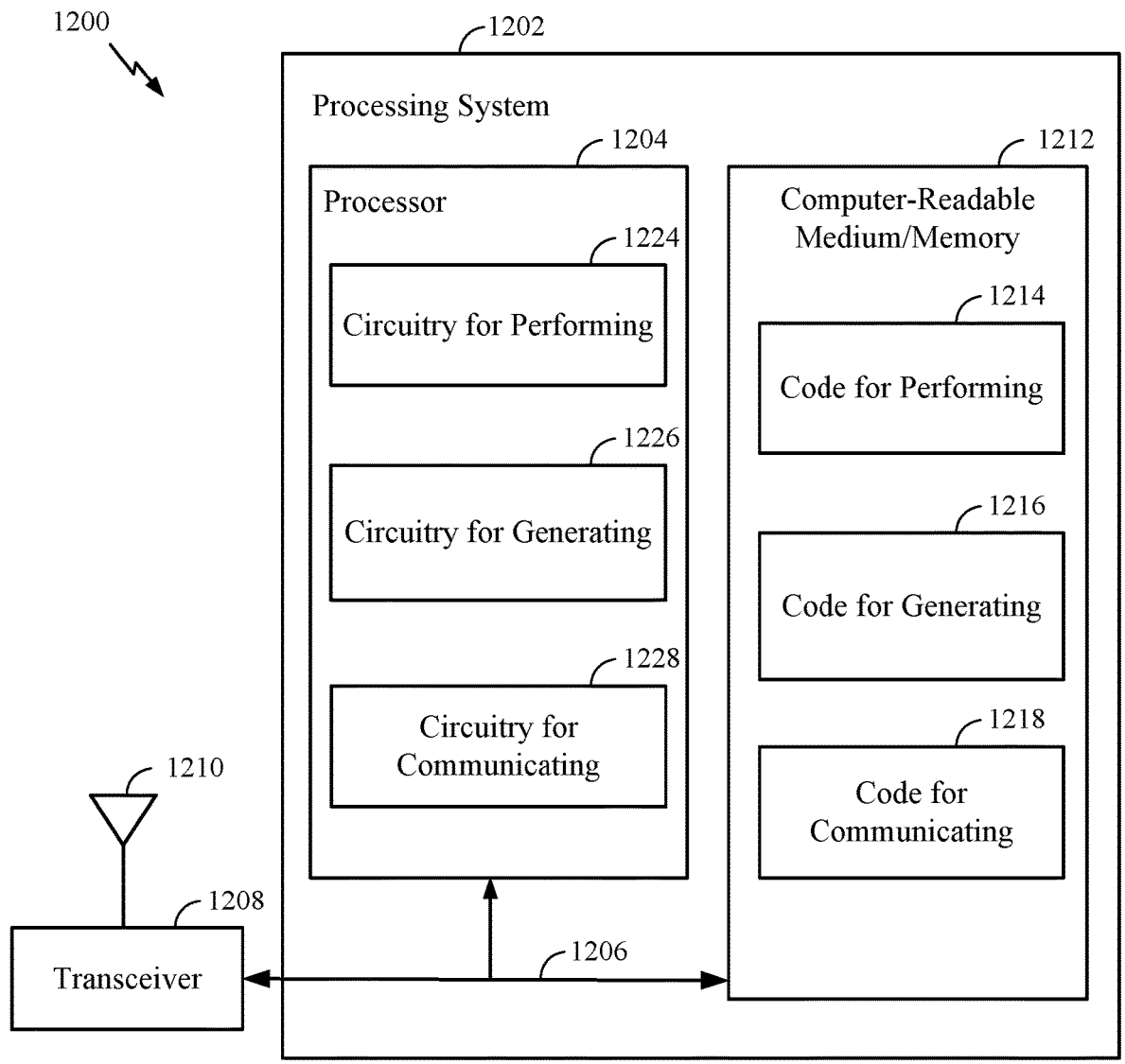
FIG. 12 illustrates an example communications device that may include various components configured to perform operations for the techniques disclosed herein in accordance with aspects of the present disclosure.
Figure 13:
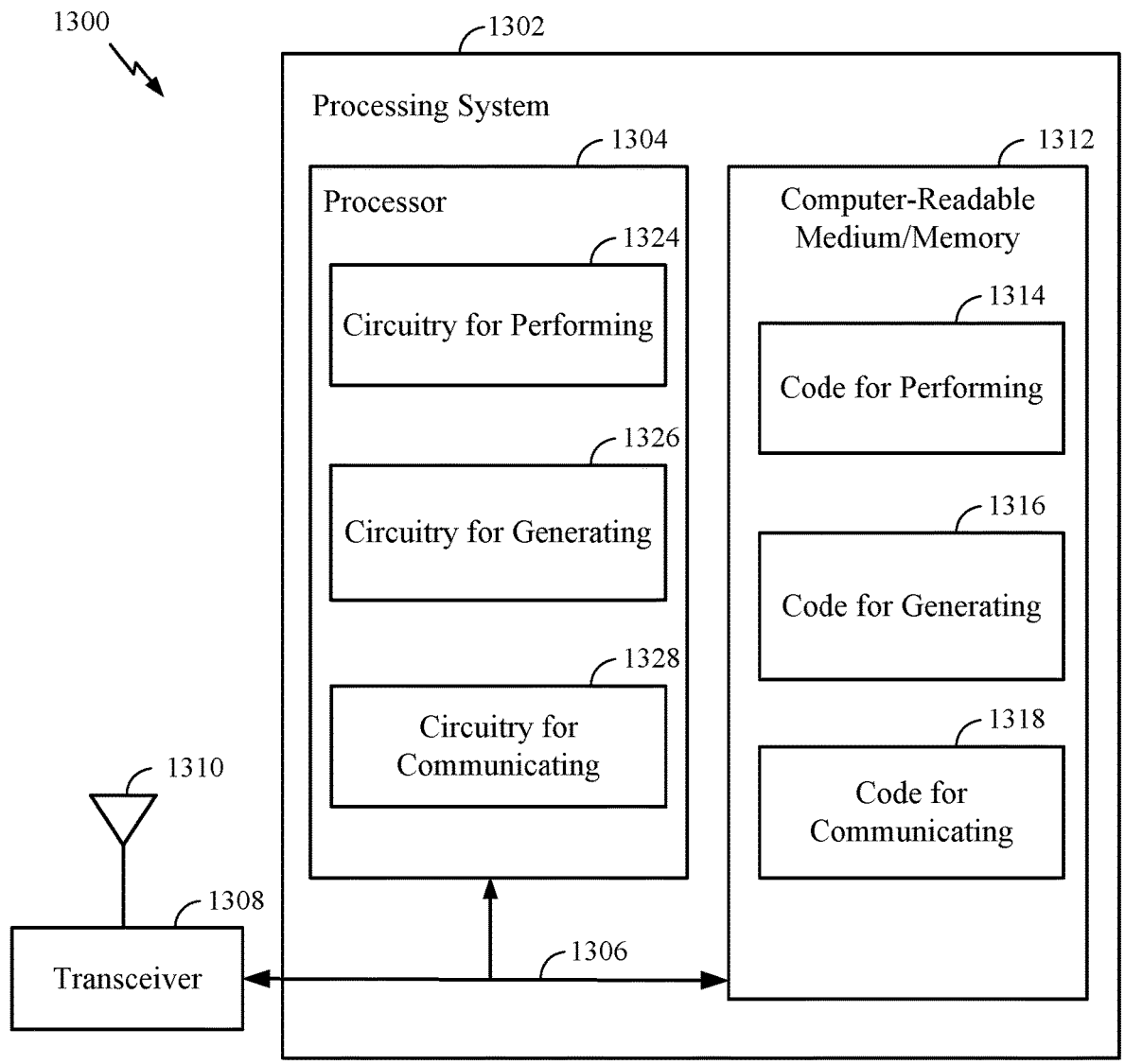
FIG. 13 illustrates an example communications device that may include various components configured to perform operations for the techniques disclosed herein in accordance with aspects of the present disclosure.

FIG. 8 is a flow diagram illustrating example operations 800 for wireless communications, in accordance with certain aspects of the present disclosure. The operations 800 may be performed, for example, by a scheduling node (e.g., such as a BS 110a in FIG. 1 or a UE 120b in FIG. 1). Operations 800 may be considered complementary to operations 700. For example, operations 800 may be performed by a BS or other (SL) node to dynamically schedule antenna resources of a UE performing operations 700.

Operations 800 may be implemented as software components that are executed and run on one or more processors (e.g., controller/processor 240 or 280 of FIG. 2). Further, the transmission and reception of signals by the scheduling node in operations 800 may be enabled, for example, by one or more antennas (e.g., antennas 234 or 252 of FIG. 2). In certain aspects, the transmission and/or reception of signals by the scheduling node may be implemented via a bus interface of one or more processors (e.g., controller/processor 240 or 280) obtaining and/or outputting signals.

Operations 800 may begin, at 802, by a scheduling node receiving results of a first beam sweep procedure performed by a first node across two or more antenna resources of the first node on two or more wireless interfaces. At 804, the scheduling node generates scheduling information based on results of the first beam sweep procedure, wherein the scheduling information indicates which of the antenna resources of the first node is scheduled for which of the wireless interfaces. At 806, the scheduling node transmits the scheduling information to the first node.

In some cases, the first node may further determine accessibility information. Accessibility information may be information indicating which nodes are accessible via which interface for a given antenna resource. To help determine the accessibility information, a UE may perform, what may effectively be a P1 beam sweep procedure across all UE mTRPs/panels. Based on the results of the P1 beam sweep procedure, UE antenna resources (mTRPs/panels) may be dynamically scheduled over all of the UE communication interfaces. The UE communication interfaces may include a combination of cellular and SL interfaces, "Uu(s)+SL(s)," more than one SL interface, "SL+SL," or more than one cellular interface, "Uu+Uu(s)."

As will be described below, the dynamic scheduling may be performed in a centralized way or a distributed way. In some cases, beam sweep procedures (e.g., P1/P2/P3 or equivalent procedures for SL beam training) may be performed per communication interface (Uu or SL) using the panel(s) scheduled for each interface.

The techniques described herein may be understood by considering a relatively simple example involving a first node, UE ("UE0") that has 2 panels, communicating (via Uu and SL) with a BS ("gNB") and another UE ("UE1"). In this example, UE0 may perform a beam sweep procedure (e.g., P1 procedure) to determine UE0 panel accessibility for the gNB and UE1.

FIG. 9 illustrates an example table 900 with accessibility information for UE0, at a given time (e.g., based on P1 measurement results). In the illustrated table, an "o" indicates a node is accessible with a given panel, while an "x" indicates inaccessibility. For example, an "o" in the second column, corresponding to UE1, and the first row, corresponding to panel-1, may indicate that UE0 and UE1 may communicate via panel-1. However, an "x" in the second column, corresponding to UE1, and the second row, corresponding to panel-2, may indicate that UE0 may not communicate with UE1 via panel-2.

In some cases, accessibility may be determined based on measurement information (from the beam sweep procedure), such as, reference signal received power (RSRP)/signal to interference and noise ratio (SINR) or RSRP/SINR ranking. As noted above, the table may be constructed based on the measurement results from a (level-1) P1 procedure. In some cases, in addition to the information shown in FIG. 9, accessibility information may also indicate whether the first node, UE0, may simultaneously communicate with more than one other node via a given panel.

For the time t1, as shown in the table, UE0 may use panel-1 to access both the gNB and UE1, while panel-2 may only be used to access the gNB. However, the panel-1 may not be used by UE0 to communicate with both gNB and UE1 at the same time, assuming one or more same antenna elements of the panel are used to form two different beams (one antenna element to the gNB and the other antenna element to UE1). Due to the limited number of antenna elements per panel in a UE, this assumption may be true for UE beam design.

FIG. 10 illustrates example of scheduling modes, in accordance with certain aspects of the present disclosure. As shown in FIG. 10, various scheduling options may be available given the example accessibility information in table 900. One scheduling option may include scheduling one of the antenna resources for multiple wireless interfaces, one at a time, using TDM. Another scheduling option may include scheduling one of the antenna resources for multiple wireless interfaces simultaneously, using at least one of SDM and FDM.

For example, as shown in table 1000 of FIG. 10, the TDM scheduling mode may be used to communicate via panels 1 and 2 on the cellular interface (Uu) with the gNB, via panel-1 and panel-2, and communicate on the SL interface with UE1, via panel-1. The SDM and/or FDM mode may be used to communicate on the Uu interface, via panel-2, and on the SL interface, via panel-1.

In some cases, the scheduling decision may be made based on the measurement results from the P1 (or P1-like) procedure together with some priority rule. The scheduled panels may then be used for subsequent (e.g., level-2 P1/P2/P3) beam sweep procedures. In some examples, a second beam sweep procedure may use a smaller set of beams and/or narrower beams than the first beam sweep procedure. In some examples, a third beam sweep procedure may use a same transmit beam as the first beam sweep procedure but refine a receive beam. By avoiding inaccessible panels, these procedures may be expedited for the SL interface (UE1) of the TDM case and for both Uu and SL interfaces for the SDM/FDM cases.

While the example above assumes a single SL interface and a single Uu interface, the example may be generalized to involve multiple (e.g., two or more) communication interfaces and nodes. For example, the multiple interfaces may include only SL interfaces, a combination of SL interface(s) and Uu interface(s), or only Uu interfaces.

FIGS. 11A and 11B illustrate example tables of accessibility information (indicating which panels of which UEs are accessible) at different times, in accordance with certain aspects of the present disclosure. While FIGS. 9 and 10 were directed to a first node, UE0, having 2 panels, communicating with other nodes, gNB and UE1, FIGS. 11A and 11B are directed to a first node UE0, having 4 panels, communicating with other nodes, gNB, UE1, and UE2. FIG. 11A illustrates accessibility information based on measurements at time t1 while FIG. 11B illustrates accessibility information based on measurements at time t2 to illustrate the update of accessibility information over time (based on measurement results from a P1 procedure).

As illustrated in FIG. 11A, at time t1, UE0 may be able to communicate with the gNB and UE2 via panel-1, communicate with the gNB via panel-2, and communicate with UE1 and UE2 via panel-3 and panel-4. At time t2, as illustrated in FIG. 11B, due to changing channel conditions (or movement of one or more of the UEs), UE0 may be able to communicate with the gNB, UE1 and UE2 via panel-1, with the gNB and UE1 via panel-2, and with UE2 via panel-3 and panel-44.

As mentioned above, in some cases, the scheduling decision may be made based on, not just the measurement results from the P1 (or P1-like) procedure, but also some priority rule(s). For example, using the case illustrated in FIGS. 11A and 11B, priority rankings may be made among all the communication interfaces: between UE0 & gNB, between UE0 & UE1, and between UE0 & UE2. Higher priority ranked interfaces may be allocated a greater share of resources (e.g., time, frequency, or spatial resources) for TDM, FDM, or SDM. The priorities may be based on one or more factors, including, the traffic quality of service (QoS) type, device/user priority, the amount of traffic, and/or channel (radio frequency (RF)) conditions.

In some cases, TDM, SDM, and/or FDM may be selected, for example, by configuration. For TDM based scheduling, each of the accessible panel(s) may be assigned to each of the communication interfaces, with certain time allocation-percentages. The allocation percentage may be determined based on the priority of each interface, with high-priority interfaces receiving a higher percentage of time.

For SDM and/or FDM based scheduling, one accessible panel may be assigned to each of the communication interfaces, again from high-priority to low-priority. In some examples, where there is more than one accessible panel for a given interface, one panel may be selected (e.g., based on a measurement metric). In some examples, where more than two interfaces share the same priority, one interface may be selected by a tie breaker (e.g., via a random way). In some examples, where no panels remain for selection, the same panel may be shared by more than one interface (e.g., via TDM, if the same panel cannot be accessible to the corresponding nodes simultaneously). In some examples, one or more panels may be assigned to a given interface (e.g., when some panels are not used by other interfaces).

In some cases, scheduling decisions may take into account whether the first node, UE0, is half-duplex or full-duplex. When UE0 is half-duplex, the assigned panels to all the communication interfaces may all need to be for TX or may all need to be for RX, for a given time. When UE0 is full-duplex, the assigned panels to all the communication interfaces may either be all for TX, all for RX, or for both TX and RX, for a given time.

The general interaction between nodes for dynamic scheduling of antenna resources may be explained, again, with the same example configuration shown in FIGS. 11A and 11B (involving communication between UE0, gNB, UE1, and UE2 via panel-1, panel-2, panel-3, and panel-4).

Given this example configuration, UE0 may perform a (level-1 P1) beam sweep procedure periodically per communication interfaces (between UE0 & gNB, between UE0 & UE1, and between UE0 & UE2). The measurement results from the corresponding node of each interface may be gathered (e.g., RSRP and/or SINR). In some cases, the UE may report the measurement result per communication interface to a gNB (or other node serving as a scheduling node) together with some priority-related information (as noted above), if the UE is not performing the scheduling itself (serving as the scheduling node).

In a centralized scheduling option, the gNB (or other node serving as a scheduling node) may perform the scheduling to determine the TRP/panel resource for each UE0 communication interface. In this case, the gNB/scheduling node may transmit to UE0 the scheduled TRP/panel resource per UE0 communication interface. In some cases, the scheduling node may only send scheduling information in the event of resource scheduling changes.

In a distributed scheduling option, the gNB (or other scheduling node) may perform the scheduling to determine the TRP/panel resource for the UE0 Uu communication interface. In this case, the gNB may transmit to UE0 the scheduled TRP/panel resource of UE0 Uu communication interface (again, possibly only if the scheduled resource changes). Further, UE0 may perform the scheduling to determine the TRP/panel resource for each UE0 SL interface.

In a centralized scheduling option, UE0 may perform the scheduling to determine the TRP/panel resource for each of its (Uu and/or SL) communication interfaces. For each communication interface, UE0 may use the TRP/panel resource scheduled for its corresponding interface to perform its beam sweep (e.g., level-2 P1/P2/P3) procedure.

To accomplish one or more of these various scheduling options, certain signaling mechanisms may be provided between UE0 and the other nodes (gNB/UE1/UE2), for example, to report and/or receive results of the Uu P1/P2/P3 procedures and/or SL P1/P2/P3 equivalent procedures. For a cellular interface (Uu), radio resource control (RRC), medium access control (MAC) control element (MAC-CE), physical uplink control channel (PUCCH), and/or physical uplink shared channel (PUSCH) signaling may be used. For a SL interface, RRC, MAC-CE, PUCCH, PUSCH, and/or physical downlink shared channel (PDSCH) equivalents (e.g., physical sidelink control channel (PSCCH) and/or physical sidelink shared channel (PSSCH)) may be used to carry the measurement results from the (level-1 P1) procedure. Similar signaling mechanisms may be used to carry the dynamic scheduling information over Uu and/or SL interfaces.

Example Aspects

Aspect 1: A method for wireless communications by a first node, comprising: performing, with two or more other nodes, a first beam sweep procedure across two or more antenna resources of the first node on two or more wireless interfaces; generating or obtaining scheduling information based on results of the first beam sweep procedure, wherein the scheduling information indicates which of the antenna resources is scheduled for which of the wireless interfaces; and communicating with the other nodes on the wireless interfaces according to the scheduling information.

Aspect 2: The method of Aspect 1, further comprising: repeating the first beam sweep procedure; and generating or obtaining scheduling information, wherein the scheduling information has been updated based on the repeated beam sweep procedure.

Aspect 3: The method of Aspect 1 or 2, wherein communicating with the other nodes on the wireless interfaces according to the scheduling information comprises: performing one or more beam management procedures using the antenna resources scheduled according to the scheduling information.

Aspect 4: The method of any of Aspects 1-3, further comprising: determining accessibility information based on the first beam sweep procedure, the accessibility information indicating which of the antenna resources can be used to access which of the other nodes; and generating the scheduling information based on the accessibility information.

Aspect 5: The method of Aspect 4, wherein the accessibility information further indicates whether the first node can simultaneously communicate with two or more of the other nodes via one or more of the antenna resources.

Aspect 6: The method of any of Aspects 1-5, wherein the wireless interfaces comprise at least one sidelink (SL) interface for SL communications between the first node and one or more of the other nodes and at least one cellular interface for communications between the first node and one or more of the other nodes.

Aspect 7: The method of any of Aspects 1-6, wherein the wireless interfaces comprise at least two sidelink interfaces for SL communications between the first node and one or more of the other nodes.

Aspect 8: The method of any of Aspects 1-7, wherein the wireless interfaces comprise at least two cellular interfaces for communications between the first node and one or more of the other nodes.

Aspect 9: The method of any of Aspects 1-8, further comprising: forwarding results of the first beam sweep procedure to a scheduling node, wherein at least some of the scheduling information is obtained from the scheduling node.

Aspect 10: The method of Aspect 9, wherein the results of the first beam sweep procedure are forwarded to the scheduling node via a cellular interface.

Aspect 11: The method of Aspect 9 or 10, wherein the results of the first beam sweep procedure are forwarded to the scheduling node via a sidelink (SL) interface.

Aspect 12: The method of any of Aspects 9-11, wherein at least some of the scheduling information is received from the scheduling node via a cellular interface.

Aspect 13: The method of any of Aspects 9-12, wherein at least some of the scheduling information is received from the scheduling node via a sidelink (SL) interface.

Aspect 14: The method of any of Aspects 9-13, wherein: the results of the first beam sweep procedure are forwarded to a network entity that serves as the scheduling node; and at least scheduling information for a cellular interface is obtained from the network entity.

Aspect 15: The method of Aspect 14, wherein the network entity also determines scheduling information for one or more sidelink (SL) interfaces.

Aspect 16: The method of Aspect 14 or 15, wherein the first node determines scheduling information itself for one or more sidelink interfaces.

Aspect 17: The method of any of Aspects 1-16, wherein the scheduling information schedules one of the antenna resources for multiple wireless interfaces, one at a time, using time division multiplexing (TDM).

Aspect 18: The method of Aspect 17, wherein a percentage of time allocated to a wireless interface of the multiple wireless interfaces for each antenna resource depends, at least in part, on a priority of that wireless interface and accessibility information determined from the first beam sweep procedure, the accessibility information indicating which of the antenna resources can be used to access which of the other nodes.

Aspect 19: The method of Aspect 18, wherein a priority of each wireless interface depends on at least one of: traffic quality of service (QoS) type, device priority, user priority, amount of traffic, and channel conditions.

Aspect 20: The method of any of Aspects 17-19, wherein: when the first node is half-duplex, each one of the antenna resources scheduled for multiple wireless interfaces, one at a time, comprise either all transmit (TX) resources or all receive (RX) resources, for a given time; and when the first node is full-duplex, each one of the antenna resources scheduled for multiple wireless interfaces, one at a time, comprise either all TX resources only, all RX resources, or both TX and RX resources, for a given time.

Aspect 21: The method of any of Aspects 1-20, wherein the scheduling information schedules one of the antenna resources for multiple wireless interfaces simultaneously, using at least one of spatial division multiplexing (SDM) and frequency division multiplexing (FDM).

Aspect 22: The method of Aspect 21, wherein at least one antenna resource is allocated to a given wireless interface based, at least in part, on a priority of that wireless interface and accessibility information determined from the first beam sweep procedure.

Aspect 23: The method of Aspect 22, wherein a priority of each wireless interface depends on at least one of: traffic quality of service (QoS) type, device priority, user priority, amount of traffic, and channel conditions.

Aspect 24: The method of any of Aspects 21-23 wherein: when the first node is half-duplex, each one of the antenna resources scheduled for multiple wireless interfaces simultaneously comprise either all transmit (TX) resources or all receive (RX) resources, for a given time; and when the first node is full-duplex, each one of the antenna resources scheduled for multiple wireless interfaces simultaneously comprise either all TX resources only, all RX resources, or both TX and RX resources, for a given time.

Aspect 25: A method for wireless communications by a scheduling node, comprising: receiving results of a first beam sweep procedure performed by a first node across two or more antenna resources of the first node on at least two or more wireless interfaces; generating scheduling information based on results of the first beam sweep procedure, wherein the scheduling information indicates which of the antenna resources of the first node is scheduled for which of the wireless interfaces; and transmitting the scheduling information to the first node.

Aspect 26: The method of Aspect 25, further comprising: receiving results of the first beam sweep procedure repeated by the first node; generating updated scheduling information based on the results of the repeated beam sweep procedure; and transmitting the updated scheduling information to the first node.

Aspect 27: The method of Aspect 25 or 26, wherein the scheduling information schedules one of the antenna resources for multiple wireless interfaces, one at a time, using time division multiplexing (TDM).

Aspect 28: The method of any of Aspects 25-27, wherein the scheduling information schedules one of the antenna resources for multiple wireless interfaces simultaneously, using at least one of spatial division multiplexing (SDM) and frequency division multiplexing (FDM).

Aspect 29: An apparatus for wireless communications by a first node, comprising: a memory and at least one processor coupled to the memory, the memory and the at least one processor being configured to: perform, with two or more other nodes, a first beam sweep procedure across two or more antenna resources of the first node on two or more wireless interfaces; generate or obtain scheduling information based on results of the first beam sweep procedure, wherein the scheduling information indicates which of the antenna resources is scheduled for which of the wireless interfaces; and communicate with the other nodes on the wireless interfaces according to the scheduling information.

Aspect 30: An apparatus for wireless communications by a scheduling node, comprising: a memory and at least one processor coupled to the memory, the memory and the at least one processor being configured to: receive results of a first beam sweep procedure performed by a first node across two or more antenna resources of the first node on at least two or more wireless interfaces; generate scheduling information based on results of the first beam sweep procedure, wherein the scheduling information indicates which of the antenna resources of the first node is scheduled for which of the wireless interfaces; and transmit the scheduling information to the first node.

ADDITIONAL CONSIDERATIONS

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 7 and 8 may be performed by various processors shown in FIG. 2 of the BS 110 and/or UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7 and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications by a first node, comprising:
 a memory; and
 at least one processor coupled to the memory, the memory and the at least one processor being configured to:
  perform a first beam sweep procedure across two or more antenna resources of the first node on two or more wireless interfaces with one or more other nodes;
  obtain scheduling information based on results of the first beam sweep procedure, wherein the scheduling information indicates one or more antenna resources of the two or more antenna resources scheduled for one or more wireless interfaces of the two or more wireless interfaces; and
  communicate with the one or more other nodes according to the scheduling information.

2. The apparatus of claim 1, wherein the memory and the at least one processor being configured to perform the first beam sweep procedure comprises the memory and the at least one processor being configured to:
 identify one or more beam pair links between the first node and the one or more other nodes, wherein each beam pair link comprises an antenna resources of the two or more antenna resources of the first node and an antenna resource of a node of the one or more other nodes.

3. The apparatus of claim 2, wherein the memory and the at least one processor being configured to communicate with the one or more other nodes comprises the memory and the at least one processor being configured to:
 perform at least a second beam sweep procedure across each of the one or more antenna resources scheduled for the one or more wireless interfaces; and
 identify, based on results of the at least the second beam sweep procedure, a strongest beam pair link to use for communicating over the one or more wireless interfaces.

4. The apparatus of claim 3, wherein the one or more antenna resources comprise a subset of antenna panels at the first node.

5. The apparatus of claim 1, wherein the one or more wireless interfaces comprises one or more sidelink interfaces with one or more sidelink nodes, one or more uplink wireless interfaces with one or more network nodes, or a combination thereof.

6. The apparatus of claim 1, wherein the two or more antenna resources comprise two or more antenna panels at the first node.

7. The apparatus of claim 1, wherein the memory and the at least one processor are configured to:
 report the results of the first beam sweep procedure to at least one node of one or more other nodes, wherein the results includes signal quality measurements for each of the two or more wireless interfaces.

8. The apparatus of claim 1, wherein the memory and the at least one processor being configured to obtain the scheduling information comprises the memory and the at least one processor being configured to generate the scheduling information based on the results.

9. The apparatus of claim 8, wherein the memory and the at least one processor are configured to signal the scheduling information to the one or more other nodes.

10. The apparatus of claim 1, wherein the memory and the at least one processor are configured to:
  perform the first beam sweep procedure periodically; and
  obtain updated scheduling information.

11. The apparatus of claim 1, wherein the scheduling information is a based on a priority associated with each of the wireless interfaces.

12. A method for wireless communications by a first node, comprising:
  performing a first beam sweep procedure across two or more antenna resources of the first node on two or more wireless interfaces with one or more other nodes;
  obtaining scheduling information based on results of the first beam sweep procedure, wherein the scheduling information indicates one or more antenna resources of the two or more antenna resources scheduled for one or more wireless interfaces of the two or more wireless interfaces; and
  communicating with the one or more other nodes according to the scheduling information.

13. The method of claim 12, wherein performing the first beam sweep procedure comprises:
  identifying one or more beam pair links between the first node and the one or more other nodes, wherein each beam pair link comprises an antenna resources of the two or more antenna resources of the first node and an antenna resource of a node of the one or more other nodes.

14. The method of claim 13, wherein communicating with the one or more other nodes comprises:
  performing at least a second beam sweep procedure across each of the one or more antenna resources scheduled for the one or more wireless interfaces; and
  identifying, based on results of the at least the second beam sweep procedure, a strongest beam pair link to use for communicating over the one or more wireless interfaces.

15. The method of claim 14, wherein the one or more antenna resources comprise a subset of antenna panels at the first node.

16. The method of claim 12, wherein the one or more wireless interfaces comprises one or more sidelink interfaces with one or more sidelink nodes, one or more uplink wireless interfaces with one or more network nodes, or a combination thereof.

17. The method of claim 12, wherein the two or more antenna resources comprise two or more antenna panels at the first node.

18. The method of claim 12, further comprising reporting the results of the first beam sweep procedure to at least one node of one or more other nodes, wherein the results includes signal quality measurements for each of the two or more wireless interfaces.

19. The method of claim 12, wherein obtaining the scheduling information comprises generating the scheduling information based on the results.

20. The method of claim 19, further comprising signaling the scheduling information to the one or more other nodes.

21. The method of claim 12, further comprising:
  performing the first beam sweep procedure periodically; and
  obtaining updated scheduling information.

22. The method of claim 12, wherein the scheduling information is a based on a priority associated with each of the wireless interfaces.

23. A non-transitory computer-readable medium comprising computer-executable instructions that, when executed by a processor of a first node, cause the first node to perform a method of wireless communications, comprising:
  performing a first beam sweep procedure across two or more antenna resources of the first node on two or more wireless interfaces with one or more other nodes;
  obtaining scheduling information based on results of the first beam sweep procedure, wherein the scheduling information indicates one or more antenna resources of the two or more antenna resources scheduled for one or more wireless interfaces of the two or more wireless interfaces; and
  communicating with the one or more other nodes according to the scheduling information.

24. The non-transitory computer-readable medium of claim 23, wherein performing the first beam sweep procedure comprises:
  identifying one or more beam pair links between the first node and the one or more other nodes, wherein each beam pair link comprises an antenna resources of the two or more antenna resources of the first node and an antenna resource of a node of the one or more other nodes.

25. The non-transitory computer-readable medium of claim 24, wherein communicating with the one or more other nodes comprises:
  performing at least a second beam sweep procedure across each of the one or more antenna resources scheduled for the one or more wireless interfaces; and
  identifying, based on results of the at least the second beam sweep procedure, a strongest beam pair link to use for communicating over the one or more wireless interfaces.

26. The non-transitory computer-readable medium of claim 25, wherein the one or more antenna resources comprise a subset of antenna panels at the first node.

27. An apparatus for wireless communications, comprising:
  means for performing a first beam sweep procedure across two or more antenna resources of the apparatus on two or more wireless interfaces with one or more nodes;
  means for obtaining scheduling information based on results of the first beam sweep procedure, wherein the scheduling information indicates one or more antenna resources of the two or more antenna resources scheduled for one or more wireless interfaces of the two or more wireless interfaces; and
  means for communicating with the one or more nodes according to the scheduling information.

28. The apparatus of claim 27, wherein means for performing the first beam sweep procedure comprises:
  means for identifying one or more beam pair links between the apparatus and the one or more nodes, wherein each beam pair link comprises an antenna resources of the two or more antenna resources of the apparatus and an antenna resource of a node of the one or more nodes.

29. The apparatus of claim 28, wherein means for communicating with the one or more nodes comprises:
  means for performing at least a second beam sweep procedure across each of the one or more antenna resources scheduled for the one or more wireless interfaces; and
  means for identifying, based on results of the at least the second beam sweep procedure, a strongest beam pair link to use for communicating over the one or more wireless interfaces.

30. The apparatus of claim 29, wherein the one or more antenna resources comprise a subset of antenna panels at the apparatus.

* * * * *